(12) United States Patent
Addleman et al.

(10) Patent No.: US 9,370,749 B2
(45) Date of Patent: Jun. 21, 2016

(54) POROUS MULTI-COMPONENT MATERIAL FOR THE CAPTURE AND SEPARATION OF SPECIES OF INTEREST

(71) Applicants: Raymond S. Addleman, Benton City, WA (US); Wilaiwan Chouyyok, Richland, WA (US); Xiaohong S. Li, Richland, WA (US); Anthony D. Cinson, Richland, WA (US); Aleksandr A. Gerasimenko, Sunderland, MA (US)

(72) Inventors: Raymond S. Addleman, Benton City, WA (US); Wilaiwan Chouyyok, Richland, WA (US); Xiaohong S. Li, Richland, WA (US); Anthony D. Cinson, Richland, WA (US); Aleksandr A. Gerasimenko, Sunderland, MA (US)

(73) Assignee: BATTELLE MEMORIAL INSTITUTE, Richland, WA (US)

(*) Notice: Subject to any disclaimer, the term of this patent is extended or adjusted under 35 U.S.C. 154(b) by 114 days.

(21) Appl. No.: 13/869,217

(22) Filed: Apr. 24, 2013

(65) Prior Publication Data
US 2014/0322518 A1    Oct. 30, 2014

(51) Int. Cl.
| | |
|---|---|
| *B01D 69/12* | (2006.01) |
| *C09D 183/04* | (2006.01) |
| *C09D 127/18* | (2006.01) |
| *C09D 127/22* | (2006.01) |
| *B01D 67/00* | (2006.01) |
| *B01D 53/22* | (2006.01) |
| *C09D 177/00* | (2006.01) |

(52) U.S. Cl.
CPC .............. *B01D 69/12* (2013.01); *B01D 53/228* (2013.01); *B01D 67/0079* (2013.01); *B01D 69/125* (2013.01); *C09D 127/18* (2013.01); *C09D 127/22* (2013.01); *C09D 183/04* (2013.01); *B01D 2323/00* (2013.01); *B01D 2323/26* (2013.01); *C09D 177/00* (2013.01); *Y10T 428/249953* (2015.04)

(58) Field of Classification Search
CPC .............................. B01D 69/12; B01D 69/125
See application file for complete search history.

(56) References Cited

U.S. PATENT DOCUMENTS

| | | | |
|---|---|---|---|
| 4,868,150 A | 9/1989 | Spooner et al. | |
| 5,019,311 A * | 5/1991 | Koslow ................ | B29C 67/243 156/283 |
| 5,820,659 A | 10/1998 | Ekiner et al. | |
| 6,126,901 A | 10/2000 | Patch et al. | |
| 7,295,308 B1 | 11/2007 | Samuels | |
| 7,338,601 B2 | 3/2008 | Schott et al. | |
| 7,360,394 B2 | 4/2008 | Parekh et al. | |
| 7,445,939 B2 | 11/2008 | Pedersen-Bjergaard et al. | |
| 7,510,595 B2 * | 3/2009 | Freeman et al. .................. | 95/45 |
| 7,553,547 B2 | 6/2009 | Fryxell et al. | |
| 7,955,574 B2 | 6/2011 | Fryxell et al. | |
| 2006/0093999 A1 * | 5/2006 | Hei .......................... | A61L 2/00 435/2 |
| 2006/0251874 A1 * | 11/2006 | McClure et al. ............... | 428/210 |
| 2006/0263668 A1 * | 11/2006 | Mikhail et al. .................. | 429/38 |

(Continued)

*Primary Examiner* — Hai Vo
(74) *Attorney, Agent, or Firm* — Derek H. Maughan (57) ABSTRACT

A method and porous multi-component material for the capture, separation or chemical reaction of a species of interest is disclosed. The porous multi-component material includes a substrate and a composite thin film. The composite thin film is formed by combining a porous polymer with a nanostructured material. The nanostructured material may include a surface chemistry for the capture of chemicals or particles. The composite thin film is coupled to the support or device surface. The method and material provides a simple, fast, and chemically and physically benign way to integrate nanostructured materials into devices while preserving their chemical activity.

10 Claims, 9 Drawing Sheets

(56) References Cited

U.S. PATENT DOCUMENTS

2007/0125702 A1* 6/2007 Ramaswamy et al. ........ 210/490
2009/0288962 A1 11/2009 Yantasee et al.
2010/0224555 A1* 9/2010 Hoek et al. ............... 210/500.42
2010/0276599 A1 11/2010 Mann et al.

* cited by examiner

Figure 8

POROUS MULTI-COMPONENT MATERIAL FOR THE CAPTURE AND SEPARATION OF SPECIES OF INTEREST

STATEMENT REGARDING FEDERALLY SPONSORED RESEARCH OR DEVELOPMENT

The invention was made with Government support under Contract DE-AC05-76RL01830, awarded by the U.S. Department of Energy. The Government has certain rights in the invention.

TECHNICAL FIELD

This invention relates to materials for extraction and separation applications. More specifically this invention relates to a porous multi-component material comprised of a nanostructured material and a porous polymeric binder, wherein the composite material provides improved capacity, selectively, stability and kinetics for extraction, separation and other chemical applications.

BACKGROUND OF THE INVENTION

Nanomaterials provide many unique properties for chemical processes. High surface area nanostructured materials provide high sorption capacities with adjustable surface chemistries that can provide controlled selectivity and chemical reactivity. The highly selective nanoengineered sorbents have shown excellent capability in capturing variety of analytes of interest. These include the following: heavy metals and precious metals from aqueous phase; gasses such as carbon-dioxide ($CO_2$); and volatiles and semivolatiles such as explosives molecules from the vapor phase. For many chemical applications the small/fine powder form of most nanostructured materials make them impractical for utilization, particularly in the field involving catalytic separation processes and/or analytical devices that need mass flow to and from the active material. Fine powders, the form of most nanostructured materials after synthesis, are not a useful form factor for most applications. As used herein, the term form factor refers to the configuration (e.g., design and geometry) of an item or object. Further, the chemical and thermal conditions required to modify and adhere the nanomaterials to supports are often destructive to the support structures, surface chemistry, and nanomaterials. The fine structure and high surface area of the nanomaterials make them physically fragile and likely to breakdown or flake off the support during use. Chemical modification of the surface of nanomaterials (i.e. salinization, solution or evaporative deposition) requires immersion in solvents and chemicals which can harm devices. As used herein, the term device encompasses a manufactured article such as, but not limited to, a sensor device (e.g., biosensor) and a semiconductor device (e.g., integrated circuit). Integrating specific nanomaterials with specific surface chemistries is very useful for sensing, separation and other chemical applications but there are clearly significant challenges to the creation of a useful device.

For chemical collection and processing, currently used pure polymer based sorbent materials often lack capacity, surface area, as well as analyte selectivity. Polymers allow for chemical and form factor modification but lack high surface areas and high densities of chemically active sites—either would result in breakdown of the polymer materials.

Additionally, a need exists for the enhancement of thin film membranes for a range of separation applications. Incorporation of nanostructured materials into polymers offers improved performance of the thin films. The combination of these materials have resulted in enhanced properties, such as increased surface area, selectivity, permeability, hydrophobicity, hydrophilicity, thermal stability, mechanical strength, and anti-biofouling. The means to effectively incorporate the nanomaterials into the thin film membrane structures enables better membrane performance. The usage of the incorporated nanostructured materials into polymers for separation and chemical reaction applications ranges from desalination, water treatment, and catalytic reactions, to gas separation. Increasing the performance of such membranes would improve process efficacy and facilitate reduced energy consumption and physical size for major chemical processing facilities.

For analytical collections, membrane separations, catalysis and other chemical processes, what is needed is a porous composite material and method that immobilizes high surface area nanomaterials, enables access of the surface area to chemical species of interest, and methods that allow the material to be manufactured in useful forms such as thin film coupled to a substrate.

SUMMARY OF THE INVENTION

In one embodiment of the present invention, a composite material for capture and separation of a species of interest is disclosed. The species of interest may be an analyte or a material. The composite material comprises a substrate and a composite thin film. The composite thin film is formed by integration of a nanostructured material into a porous polymer. The composite thin film is coupled—or bonded, coated, or painted—to the substrate via dip coating, spin coating, drop coating, molding, casting or spray-on.

The nanostructured material may first be functionalized to be selective for the species of interest.

In some embodiments, the weight percentage of the porous polymer in the composite thin film is in a range from about 1% wt. to about 99% wt. In other embodiments, the weight percentage of the porous polymer in the composite thin film is in a range from about 5% wt. to about 40% wt. In one embodiment, the thickness of the thin film is in a range of about 0.1 µm to about 100 µm.

In one embodiment, the substrate is coated by the thin film. The substrate is, but not limited to, one of the following: a fiber, a metal wire, a bead, a planar support, flexible silica coated wire, a cloth material, or a tubular structure. The planar support can be made from glass, plastic, metals such as stainless steel, leather, rubber, wood, or combinations thereof.

In one embodiment, the surface chemistry is installed on the nanostructured material prior to inclusion of the nanostructured material into the polymer. As used herein the term installed or installation may be used interchangeably with binding or grafting, depending on the application.

The surface chemistry can form a chemically reactive layer. The chemically reactive layer is, but not limited to, at least one of the following: a sorbent or sorbent layer, a silane, a phosphoric acid, a physisorbed low vapor pressure organic, or a covalently bound surface chemistry.

The sorbent or sorbent layer may comprise of a multifunctional chemistry. The multifunctional chemistry is, but not limited to, at least one of the following: organics, organometallics, metals, nanoparticles, complex molecules, or combinations thereof. The appropriate surface chemistry is selected to enhance capture, aid in dispersion into the composite thin film and support wettability.

The species of interest is in a gas-phase or a liquid-phase. The gas or liquid-phase species is, but not limited to, at least one of the following: an explosive, an explosive variant, a chemical weapons agent, a pesticide, a drug, a volatile organic compound (VOC), a semi volatile compound, a precious metal, a toxic metal, a rare earth element, or a radio nuclide.

In one embodiment, the thin film bound to the substrate is integrated into commercially available equipment that directly interfaces with analytical testing equipment. The analytical testing equipment is, but not limited to, at least one of the following: a gas chromatographer (GC), gas chromatography mass spectrometer (GC-MS), an ion mobility spectrometer (IMS), or a head space analyzer.

The nanostructured material is, but not limited to, at least one of the following: nanoporous silica, nanofiber silica, nanoparticle metal oxide, mesoporous silica, and composites of mesoporous silica, carbon nanotube, metal-organic framework (MOF), graphene, high surface area polymer, a ceramic, mesoporous carbon, activated carbon, or a metal particle.

The porous polymer is, but not limited to, one of the following: polydimethylsiloxane (PDMS), polytetrafluoroethylene (PTFE), hydroxypropyl cellulose (HPC), sulfonated tetrafluoroethylene, or polyamide. The porous polymer can be used as a monomeric solution that undergoes a condensation reaction, a suspended polymer, and a fiber form.

The thin film may be deposited onto the support via dip coating, spin coating, drop coating, molding, casting, or spray-on.

In another embodiment of the present invention, a method of making a composite material for capture and separation of a species of interest is disclosed. The method includes providing a substrate. The substrate may be modified physically (i.e. roughing or etching) or chemically etched to enhance adhesion of the thin film. The method also includes coating the substrate with a composite thin film formed by combining a porous polymer with a nanostructured material. The method further includes adding functionalized chemistry on a surface of a nanostructured material.

In another embodiment of the present invention, a composite material for capture and separation of a material is disclosed. The composite material includes a substrate and a composite thin film. The composite thin film is formed by combining a porous polymer with a nanostructured material having surface chemistry for capture of the species. The composite thin film is coupled to the substrate. The weight percentage of the porous polymer in the thin film is in a range of about 5% wt. to about 40% wt. The thickness of the thin film is in a range of about 0.1 μm to about 100 μm.

In another embodiment of the present invention, a method of making a composite material for capture and separation of the species of interest is disclosed. The method comprises providing a substrate. The method also comprises coating the substrate with a composite thin film formed by combining a porous polymer with a nanostructured material. The method further comprises including functionalized chemistry on the surface of the nanostructured material. The surface chemistry may be installed on the nanomaterial prior to inclusion in the polymer.

In another embodiment of the present invention, a composite material for capture and separation of a species of interest is disclosed. The composite material comprises a composite thin film formed by combining a porous polymer with a nanostructured material.

DETAILED DESCRIPTION OF THE PREFERRED EMBODIMENTS

The present invention is directed to materials and methods that provide improved capacity, selectivity, stability and kinetics for, among other things, analytical, extraction and separation applications. The materials can be applied to catalysis and other chemical reaction applications. In one embodiment, the material is comprised of nanostructured materials combined with a porous polymeric binder for adhesion and stability.

The nanostructured materials have high surface area and specific surface chemistries that provide a large a concentration of sites for analyte or material capture and/or chemical processing. The porous polymer, typically 10-30% wt., provides a binder for the nanomaterials. Using a porous polymer binder, the thin film composite overcomes one of the primary challenges to using nanomaterials—integration and stabilization into useful devices/form factors without blocking the chemically reactive sites. While the material can be formed into almost any shape, several applications discussed herein focus upon thin films. Thin films provide rapid kinetics of capture of the species of interest and can be placed upon any macrostructure desired. These thin films provide increased surface area, permeability, capacity, chemical activity, selectivity, thermal stability, mechanical strength, and anti-biofouling properties for certain separations of mixed solutions or volumes of gas.

Examples of valuable applications of the present invention include the following. The composite thin film can function as an analyte capture and concentration material for trace level detection in air or aqueous environments. Applications also include collectors for analytical systems and sensor enhancement coatings. The material can also be used for enhanced membrane separations of gasses and liquids. The composite thin films with membrane surfaces increase efficiency of separations. Further, the composite material can be utilized in a range of industrial separation applications and have been shown to provide recovery of precious metals such as Ag and rare earth metals.

In one embodiment, the surface chemistry, nanostructured material, polymer and support structure of the present invention can be synthesized or assembled separately. The resulting slurry of nanostructured materials and polymers can be deposited as desired upon a structure of interest. In this embodiment, the isolated preparation of the separate components followed by simple sequential assembly and integration is very advantageous. The ease and flexibility of deposition upon the device is very advantageous. In some cases the polymer may provide synergistic properties beyond adhesion such as increased chemical affinity or hydrophobicity/hydrophilicity of the material to enhance performance.

The present invention includes thin film compositions to be utilized as an extraction or sampling device for either gas or liquid phase materials. The device form factors that utilize the thin films can be specifically designed to work with existing sampler equipment currently in the field or in a laboratory environment.

Sampling devices constructed with thin films of the present invention have high affinity and selective capture properties to targeted species that include explosives, explosive variants or precursors, chemical weapon agents, pesticides, and other volatile organic compounds (VOCs), semi-volatile organic compounds, metals and radionuclides.

Alternatively, the composite thin films can be utilized in separation applications for target chemicals or chemical compounds in both liquid and gas environments. For example, the composite thin film devices can be used in separation applications such as carbon monoxide (CO) separation from carbon dioxide ($CO_2$) or ethanol from water.

Film support materials utilized include, but are not limited to, metal wires, flexible silica coated wires, plate structures, silica coated plate structures, cloth materials, fibers, or the inside of various tubular structures. These support materials can be coated with various layers of the thin film to provide desired characteristics of the sampling device.

Compositions of the thin film coating the support may comprise several materials. Materials used in the thin film coatings include a pure or unmodified mesoporous silica support, nanofiber silica, ceramic composite, high surface area polymer, or other nanostructured materials such as carbon nanotubes, metal organic frameworks (MOFs), nanoparticles, graphene, mesoporous carbon, or activated carbon. The ceramic composite sorbent material may consist entirely of ceramic or of a hybrid ceramic polymer/organic composite.

The thin film coatings can be applied in multiple layers to increase thickness or surface area as well as for adhesion enhancement. Further, multiple layers can provide increased mechanical properties such as stiffness while also controlling the thermal properties of heating and cooling. The thin film material can be applied in any standard way and deposited onto the support by dip coating, spin coating, drop coating, molding, spray-on, casting, and other techniques. Additionally, the material can be packed into a sorbent column for performing extraction by way of a packed sorbent.

The use of a nanostructured material, which can be a nanostructured ceramic, and a porous polymer in a thin film composition improves stability and adhesion and promotes mass flow for better sampling. The process does not require a high temperature sintering process to effectively bind the sorbent material to the sorbent structure. The ability to pre-functionalize sorbent materials prior to installation on sampling devices allows for maximum functionality and ease of uniform manufacture.

A variety of surface functionalizations can be installed through silane chemistry methods on the sorbent materials. The sorbent surface chemistries selected can have attributes of selectivity, thermal stability and high affinity to various species of interest depending on the application. This method results in a more uniform thin film. The use of ceramic and polymer can stabilize normally unstable materials that are desired to be used for their high capacity properties.

In one embodiment, beneficial performance and practical application can be achieved through the optimization of the composition of silica or other porous support and polymer without the destruction of sorbent functions. A silica and polymer slurry may be coated on stainless steel wires, planar or other supports, to overcome the disadvantage of fragile substrates found commercially. Composites of the present invention provide a desired surface chemistry, retention of nanostructure, and chemical activity while resolving issues with adhesion to the surface and degradation during use.

Chemically modifying the surface of the nanostructured material to increase affinity toward the material of interest may be conducted by pre-installation of the sorbent on the nanostructured material. Pre-functionalization allows for an increase in the varieties of functional groups utilized as well as simplifies the functionalization of the materials.

The nanostructured material can be made as a thin film coating on most support structures or as three-dimensional shapes (e.g., particles and monoliths). Some specific applications for the nanostructured material includes the following: Solid Phase Microextraction (SPME) or large volume solid phase extraction and trace sampling; explosive detection; chemical weapons and toxic industrial chemical capture; radionuclide separation and detection; vapor or liquid phase sampling; chemical separation, including rare earth separation, uranium separation, and recovery of precious metals; organic detection; sensor enhancement; low temperature catalyst process; membrane separation applications; and chemical processing.

The present invention includes materials for improved capacity, selectivity, stability, and extraction efficiency for chemical separation and collection applications. The materials can be applied to catalysis, battery and other chemical reaction applications. The invention described herein details multiple configurations. While the material can be formed in most any shape, most applications discussed herein focus upon thin films. Thin films provide rapid kinetics and can be placed upon any macrostructure desired. The composite material, in one embodiment, is comprised of nanostructured materials combined with a porous polymeric binder for enhanced adhesion and stability. The nanostructured materials have high surface area and can have specific surface chemistries that provide numerous (sometimes more than 5 ligands/$nm^2$) reaction sites for analyte or material capture and/or chemical processing. The polymer, typically, but not limited to, 1%-99% wt. or 5%-40% wt. and porous, provides a binder for the nanostructured materials. Using a porous polymer binder in the material overcomes one the primary challenges to using nanostructured materials for practical chemical applications—integration and stabilization into useful devices and form factors without blocking the chemically reactive sites.

Figure 1:
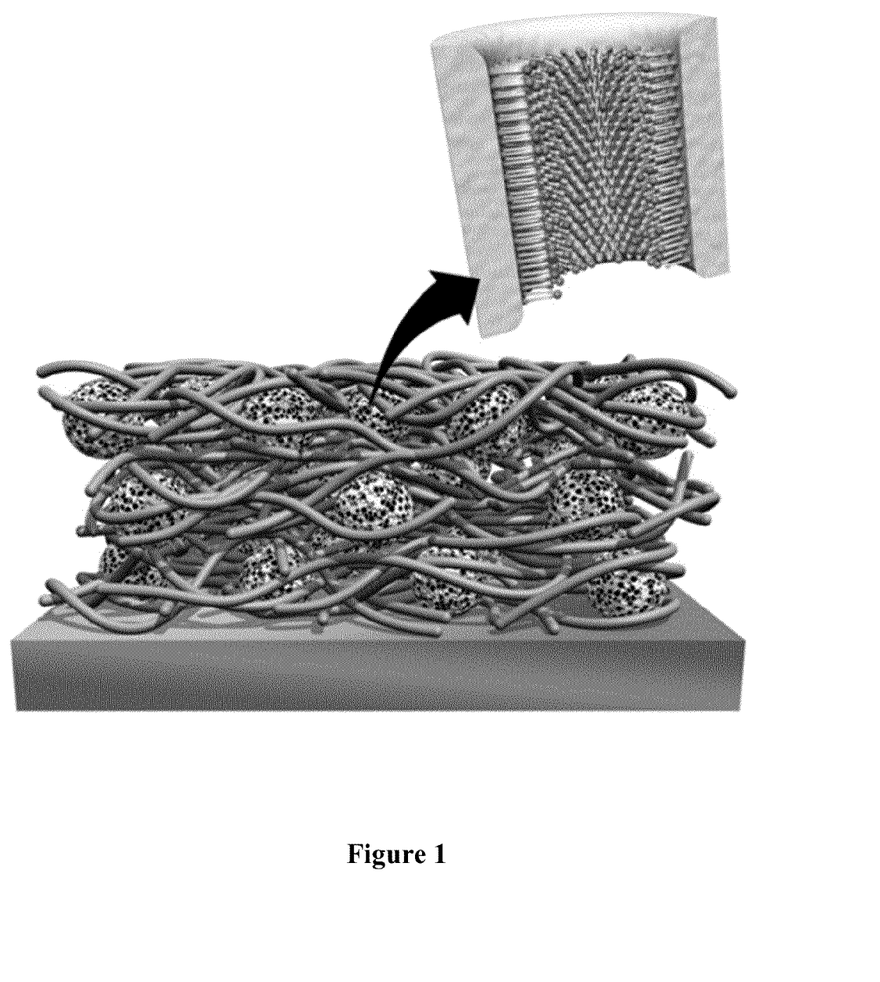
FIG. 1 illustrates a conceptual image of a composite material in a thin film coated on a support structure, in accordance with one embodiment of the present invention.

A graphical example of a composite material in a thin film coated on a support structure, in accordance with one embodiment of the present invention, is shown in FIG. 1. In FIG. 1, the strands show the binding polymer materials. The flexible ropes represent porous polymeric material binding the chemically active nanostructured material in place. In this image the nanostructured material is shown as porous spheres. The porosity provides high surface area which provides high chemical reactivity. The arrow indicates a blow up of one of the pores showing the surface chemically modified to enhanced chemical activity. The graphic illustrates and suggests a high density self-assembled monolayer on the nanomaterial surface. Other materials, structures and surface chemistries can be used and have been reduced to practice. Thin films are a desirable form factor since they provide rapid kinetics and can be installed upon many microstructures.

In addition to the composite thin film functioning as a species capture mechanism for trace level detection in both air and aqueous environments, the composite thin film can be utilized in separation applications. These thin films provide increased surface area, permeability, capacity, chemical activity, selectivity, thermal stability, and mechanical strength for certain separations of mixed solutions or volumes of gas. Altering film composition layers can control the physical, kinetic and chemical separation properties of certain devices. Example applications include membrane separations of gasses and liquids. The composite thin films could modify both the internal and external membrane surfaces increasing efficiency of separations. For example, usage of the composite thin film technology could improve flux and performance for desalination membranes, membranes for gas (i.e. CO from $CO_2$) or liquid separation (ethanol from water), catalytic reactions, or improve recovery of precious metals such as gold (Au), silver (Ag), platinum (Pt), and rare earth metals.

The nanostructured materials can be assembled using techniques such as surfactant templated sol-gel or self-terminating nanoparticle synthesis. The support structure (wires, sensor surfaces, meshes, etc.) can be manufactured using established techniques. The polymers are commercially available as liquid or solid precursors. The desired surface chemistry can then be installed on the nanostructured material using known methods such as silanization, evaporative deposition and acid-base reactions. The (possibly surface modified) nanostructured material can be dispersed into the polymer with solvent as needed. Further, dispersion of material and homogeneous slurry can be enhanced by using stirring, shaking, and/or sonication techniques. The resulting slurry of nanostructured material(s) and polymers can be sprayed, spin coated, dropped, dipped, painted, or otherwise deposited as desired upon the structure of interest. In some cases, the polymer may provide synergistic properties beyond adhesions such as increased chemical affinity or hydrophobicity/hydrophilicity of the material.

Nanostructured ceramics such as alumina, titania and silica materials possess large surface areas and retain chemical, thermal and mechanical stability. For example nanoporous (i.e. MCM-41), nanofiber (i.e. cabosil) and amorphous silica have been successfully utilized. Further, a wide range of surface chemistries can be installed on the silica (and other materials) with established chemical process methods, including silanization, to increase affinity and selectivity toward various chemicals of interest. Other high surface area nanostructured materials, such as carbon nanotubes, MOFs, metal oxide materials, graphene, mesoporous carbon, or activated carbon, can also be utilized in the composite thin films. Each of these high surface area structures provide unique advantages when properly combined with a selected polymer to create a specific polymer-nanomaterial composite for enhanced chemical processing/sampling. For smooth thin films particle sizes of less than 0.5 microns were preferred. Larger particle sizes (>0.5 micron) maintaining both nanoporosity and significant surface area resulted in textured and uneven surface properties—which might be desirable if turbulent flow over the surface or surface texture is desired.

The composite thin films of the present invention have the added benefit of high overall surface area, due to the high surface area nanomaterial and the structural and adhesive support of a polymer network. This translates into a device that has flexible and selectable surface chemistry and is more stable than current devices. Further enhancement of the material may be achieved by optimizing the composition of nanostructured material to polymer ratio to maintain high surface area and sufficient stability/adhesion. The nanocomposite film coatings of the present invention have shown success in the extraction of vapor phase analytes in a SPME configuration as well as other embodiments such as thin films applied to surfaces for collection from aqueous environments for heavy metals, precious metals, radionuclides and semipolar organics. These materials have been tested for the sampling and detection of radionuclide particles.

Figure 2A:
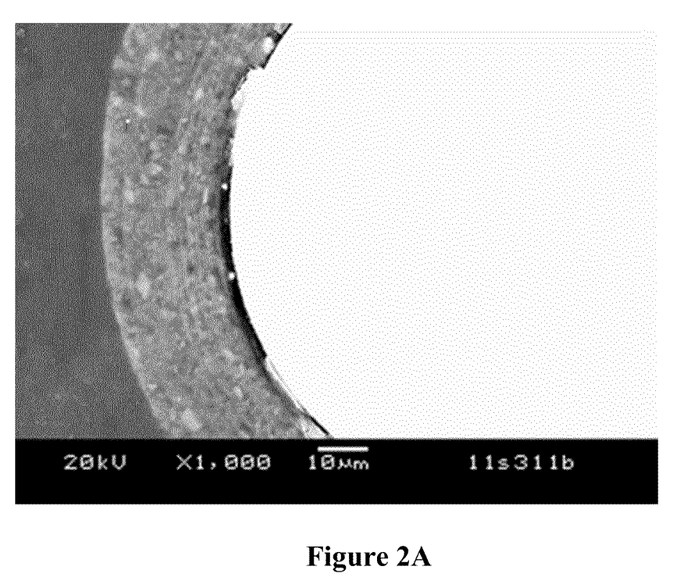
FIG. 2A shows an SEM image of a metal wire support coated with a composite thin film formed by combining a polymer with a nanoporous silica material.
Figure 2B:
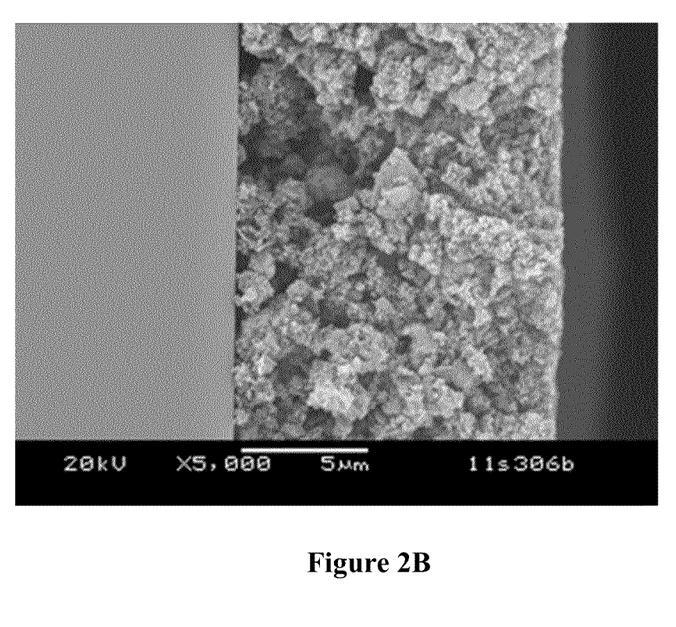
FIG. 2B shows an SEM image of a planar support coated with a composite thin film that was formed by combining a polymer with a nanoporous silica material.
Figure 2C:
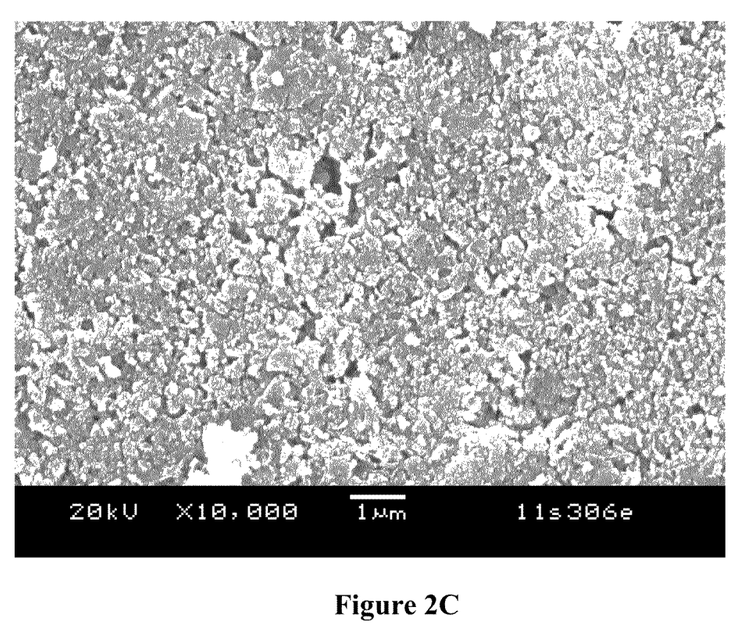
FIG. 2C shows a top view of a substrate coated with a composite thin film formed by combining a polymer with a nanoporous silica material.

The composite material can be coated on a range of surfaces. Selected examples are shown in FIGS. 2A, 2B, and 2C. This approach combines the high surface area and controllable surface chemistry of nanostructured materials, such as porous silica, with the flexibility and durability of a polymer coating. The porous thin film coatings provide extremely rapid kinetics and enable a range of analytical applications that benefit from thin films. These include X-ray fluorescence (XRF), alpha particle spectroscopy, and infrared (IR) spectroscopy.

SEM images of nanomaterial silica and polymer coatings on metal and planar supports are shown in FIGS. 2A and 2B, respectively, and FIG. 2C shows a top view of a substrate coated with a composite thin film formed by combining a polymer with a nanoporous silica material.

Referring to FIG. 2A, which shows a SEM image of a metal wire support coated with a composite thin film formed by combining a polymer with a nanoporous silica material, the sorbent materials bound by the polymer material are clearly visible. The composite thin film has surface area of 642 $m^2/g$. It was composed of 90% wt. MCM-41 (was milled to less than 0.5 micron particle size) with 10% wt. Nafion®. Nafion® is a commercially available porous polymer that has a hydrophobic/hydrophilic structure. It has been widely used in various fields in different conditions due to its highly stable characteristics in a variety of chemicals (solvents, salt, acid, and alkaline solutions), high operating temperature, good performance under humidified condition, and antibiofouling properties. Nafion® is easily fabricated in various forms and on various substrates depending on specific properties applications. The film shows the addition of various layers, like tree rings, added to increase capacity of the sorbing thin film. In this case additional layers were added, to increase film thickness and capacity, by dip coating in polymer-particle slurry.

Referring to FIG. 2B, which shows an SEM image of a planar support coated with a composite thin film that was formed by combining a polymer (10% wt. Nafion®) with a nanoporous silica material (90% wt. of 0.5 micron MCM-41), the composite thin film has surface area of 642 $m^2/g$. In this case the film was applied by drop coating deposition. In this case a drop of MCM-41/polymer slurry on the top of cover, spread the slurry, remove the excess of slurry from the edge of cover, then dry the coatings at room temperature and 50° C. for overnight. Screening printing, doctor blading, spin coating and other techniques are also effective deposition methods, particularly with thinner films are desired. Additional layers could be added, to increase film thickness and capacity.

Referring to FIG. 2C, this particular composite thin film has surface area of 642 $m^2/g$. It was composed of 90% wt. MCM-41 (was milled to less than 0.5 micron particle size) with 10% wt. Nafion®. The surface can be seen to be reasonably uniform. The larger microstructured holes, typically formed during curing of the film, provide opens to enhanced mass transport into the film. Film composition and process conditions can be controlled to enable the desired porosity and surface smoothness.

In the SPME application metal wires and traditional silica fibers have been explored, as shown in FIGS. 2A-2C and FIG. 3. The nanocomposite thin film has been incorporated into a SPME device that has shown many advantages over the commercial device currently being used. The nanocomposite increases surface area/sorbent capacity by up to 30,000 times (thickness and formulation dependent) over unmodified surfaces. The nanocomposite film can exceed the best polymer film performance with an example shown in FIG. 3 and later in table 1. Surface chemistry modification is non-trivial but the full range of silane chemistries can be installed on the nanomaterial, typically silica to date, for targeting various species of interest. Silica and other nanostructured ceramics are also chemically and thermally stable. Using a nanocomposite coating addresses many of the stability issues existing with commercial devices. The nanocomposite film coatings have shown success in the collection of vapor phase analytes in, for example, a solid phase micro extraction SPME configuration of FIG. 3.

Figure 3:
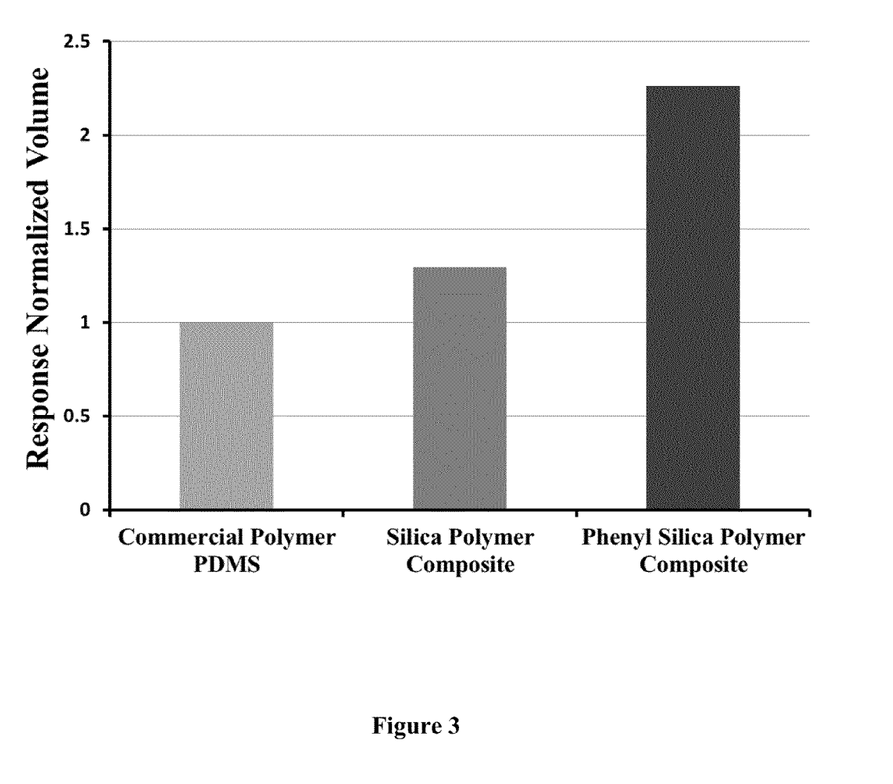
FIG. 3 shows a comparison of various surface chemistries of composite thin film coated metal wires compared to a commercial polymer in the collection of vapor phase analytes in a Solid Phase Micro Extraction (SPME) configuration.

For the example of FIG. 3, the composite thin films were composed of 90% wt. nanostructured materials and 10% wt. Nafion®, with equivalent thickness. The collected analyte— 2,4-Dinitrotoluene, DNT, in this case—was thermally desorbed and analyzed by gas chromatography after exposed to the analyte vapors in sealed chamber for 20 hours. The performance of the composite thin film was reported in terms of "response normalized volume" which is defined as the obtained response per thin film volume of nanocomposite thin film normalized to response per thin film volume of the commercial polymer polydimethylsiloxane (PDMS). The composite thin films, even with raw nanostructured silica, do better than simple polymer films presently produced as commercial products. The addition of surface chemistry to the nanostructured material in the film increases the sorbent material affinity for collection of analytes or materials. In this case phenyl showed high affinity for collecting DNT in vapor phase. Performance of the composite thin film can be further improved by adjusting surface chemistries to provide more affinity capacity or selectivity. For example, phenyl functionalized silica/Nafion® composite signal was more than 2 times the commercial (PDMS) SPME signal. Functionalization using an organometallic complex is expected to further increase relative performance Clearly, as shown in Table 1, the improvement of surface chemistries can enhance chemical affinity and selectivity of the composite material. It summarizes the performance of various nanostructured materials, different surface chemistries, and traditional materials incorporated into a polymer for vapor collection from an air sampling, 2,4-Dinitrotoluene (DNT) vapors in this case. The performances of composite thin film are reported in the term of "relative mass capture" which is calculated from the mass of the captured analyte per mass of the composite thin film normalized to the mass of the captured analyte per mass of the pure polymer. These nanostructured material composite coating/films provide significantly improved collection capacity, greater capability than a pure polymer, Nafion® in this case. Chemically modified nanostructured materials (phenyl, organometallic complex, and thiophene in this case) provide further improvements in terms of mass and volume of thin films. Thiophene on mesoporous carbon demonstrates the highest performance per unit mass of all composite thin films. Meanwhile, the europium organometallic complex europium-thenoyl trifluoro acetone (Eu-TTA) on mesoporous silica shows the best performance per unit volume of composite thin film. The different sorption abilities of each respective nanostructured material, obtained are impacted by many factors including the surface chemistries, chemical selectivity of the vapor, the formation/bonding between material and polymer, and porosity of the composite thin films. The composite thin films coating glass discs (25 mm diameter) were composed of 60% wt. nanostructured material and 40% wt. Nafion®.

TABLE 1

DNT vapor collection with composite materials comprising different nanostructured materials and chemistries integrated with a polymer

| Thin Film Composition (with 40% Nafion wt./wt.) | Relative mass capture |
|---|---|
| Pure polymer | 1 |
| Iron Oxide Nanoparticles integrated polymer | 9 |
| Nanofiber Silica | 17 |
| Metal Oxide Framework (Basolite ® C 300) | 23 |
| Mesoporous Carbon | 85 |
| Nanoporous Silica | 100 |
| Phenyl Modified Nanoporous Silica | 107 |
| Eu modified Mesoporous Silica | 114 |
| Thiophene modified mesoporous carbon | 121 |

The data for Table 1 was obtained by allowing fibers to contact and saturate with DNT vapors or until phase equilibrium was reached. A liquid extraction technique was employed to quantitatively remove the captured DNT from the composite thin film. A solvent—acetone in this case— was placed on the exposed sample in a vial, then sealed with screw cap, and sonicated for 30 minutes. The supernatant was separated and subsequently analyzed with a GC-MS.

The research and development process of the composite thin film materials experimented with various nanostructured materials and polymers incorporated in various combinations and concentrations for optimum performance. For example, two primary film qualities were notable in the SPME configuration where a composite thin film was applied to a rigid support wire. A high surface area sorbent material such as nanoporous silica provided the necessary species capture sites to improve overall performance of the new SPME device. A number of polymers such as PDMS, HPC, and Nafion® were tested.

Figure 4:
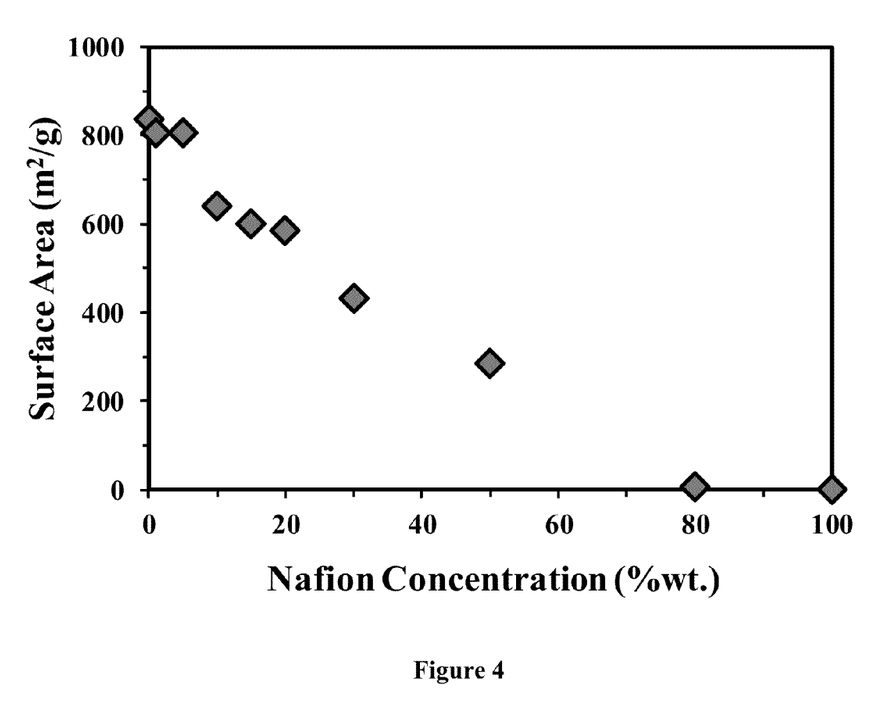
FIG. 4 shows a comparison of the effect of a porous polymer concentration on composite material surface area.
Figure 5:
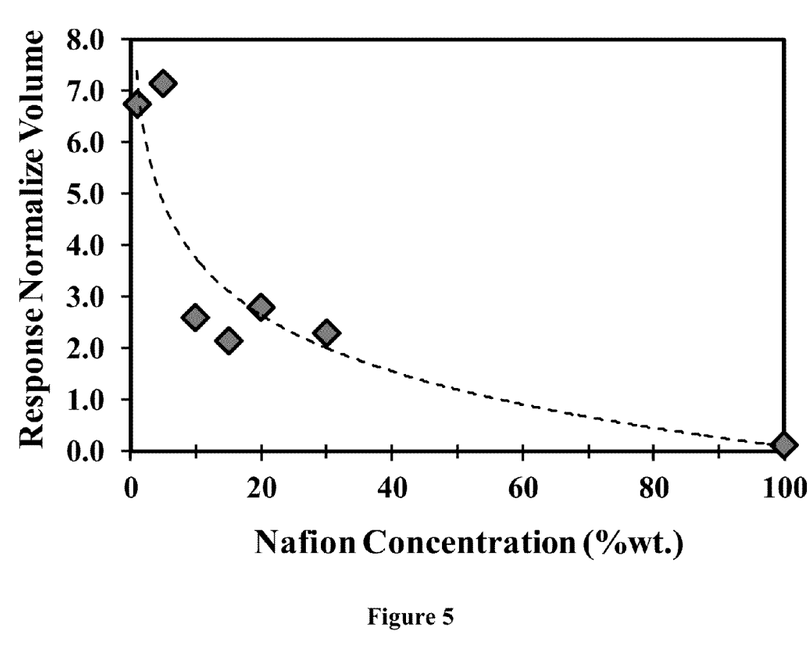
FIG. 5 shows a comparison of the effect of a porous polymer concentration on the composite thin film performance.

Film stability and surface area was achieved by using only 10% polymer in the film as a binder for the nanomaterials. This polymer concentration provides a well adhered film to the wire support and provided excellent analytical repeatability. The structure of composite thin films and performances are primarily dependent on the material loading and polymer composition. Both components play important roles in the availability of binding sites, sensitivity, permeability, adhesion, and the stability of the thin film coating. As seen in FIGS. 4 and 5, when too much polymer concentration was used in the composite composition a decrease in surface area and performance was observed. However, when the polymer concentration is too low the result is a thin film with poor adhesion, cracking of the thin film, and loss of the nanomaterial due to insufficient amounts of the polymer to act as a binder. Similar trends were observed with other polymers and nanomaterials. The best performance with practical application can be achieved through optimization of the nanomaterial loading and polymer composition. Sensitivity of nanoporous silica/polymer coating on stainless steel wire depends in part on the large surface area of nanoporous silica. As a consequence of increasing polymer concentration, the overall surface area of the composite material decreases. Optimization of the composite ratios provides high surface area chemical collection or reaction, reproducible results, good film structures, and surface adhesion/stability. Optimization of the thin film composition is needed for each application depending on environmental use (e.g., phase of analytes, mechanical strength, flexibility, abrasion, durability, and other forces).

FIG. 4 shows a graphical representation of the effect of a porous polymer (Nafion® in this example) concentration on composite material surface area. As the capture of species is expected to mostly occur onto the surfaces of nanostructured sorbents, the large surface area and volume of thin film are key aspects for achieving the high adsorption capacity of analytes. Therefore, the optimization of composite film is important for stability of the composite film and for the high surface area of nanoporous silica to interact with analytes. In this case the nanostructured material used was nanoporous silica (MCM-41) milled to less than 0.5 micron particle size). Clearly as polymer percentage increases the available surface area for chemical processes decreases—or reduce chemical activity of film on a per volume basis. However, as the polymer percentage increases the stability of the film increases resulting in an optimal range (percent weight of polymer and nanostructured material) which is material and application specific. Other polymers and nanomaterials show similar trends.

FIG. 5 shows the effect of porous polymer concentration on the composite thin film performance. In this example nanoporous silica (MCM-41 milled to less than 0.5 micron particle size) was used and formed with a polymer (Nafion®) on metal wires. The collected species of interest—DNT in this case—was thermally desorbed and analyzed by gas chromatography after exposed to the species vapors in a sealed chamber for 20 hours. Polymer concentration directly affects the capability and stability of thin film for applications. The capture ability of composite thin film is decreased when increasing the polymer composition. The capture ability of the composite thin film strongly depends on the amount of nanostructured material contained in the film.

DNT was chosen as a representative explosive for evaluation of the performance of polymer-nanoporous silica composite thin films due to its semi-volatile pressure, and the sampling of DNT vapor at room temperature has been routinely demonstrated. It demonstrates analogous to other materials of interest in the gas/vapor phase. The performance of composite thin films are reported in the term of "response normalized volume" which were calculated from the obtained response per thin film volume of nanocomposite thin film normalized to the commercial polymer PDMS. The polymer PDMS is a standard widely utilized collection media. In this case the polymer was Nafion® and nanomaterial was mesoporous silica—with particle size milled to less than 0.5 microns.

The capture ability of the composite thin film is decreased when increasing the polymer composition, as a consequence of decreasing surface area of the composite thin film (see FIG. 4). Additionally, gas permeability of the thin film decreased when the loading of nanoporous silica was decreased. The capture ability of the composite thin film strongly depends on the amount of nanostructured material contained in the film as DNT capturing mainly occurs on the nanoporous silica surface. However, less polymer results in the instability of thin film. Therefore, enhanced performance with practical film stability can be achieved through optimization of the nanomaterial loading and polymer composition for each application. Other materials show similar trends.

Another example is increased vapor collection from an air sampling device with a functionalized composite thin film coating. The data in Table 2 shows the enhanced capture for DNT vapors with the various modifications of the materials. As shown in Table 2 the addition of a typical polymer coating, PDMS in this case, is helpful for collection. The addition of a nanostructured material composite coating/film provides significantly improved collection capacity. Using chemical modified nanostructured materials—phenyl silanes installed on nanoporous silica in this case—provides further improvements. As shown in Table 2, improvements of over 5000 times are possible. The chemical selectivity of the vapor and capacity of the device will be affected by the choice of polymer and surface chemistry of nanomaterial utilized. Other gasses and surface chemistries can be utilized.

TABLE 2

Effect of composite thin film coating on metal fibers.

| Collection Material* | Vapor capture ($\mu$g DNT/cm$^3$) | Vapor Capture Enhancement |
|---|---|---|
| Mesh Fibers | 0.054 | 1 |
| Metal fibers with PDMS coating | 32 | ~600 |
| Nanoporous silica/PDMS composite coating on metal fibers | 253 | ~4700 |
| Phenyl modified Nanoporous silica/PDMS composite coating on metal fibers | 294 | ~5400 |

*The data for Table 2 was obtained by allowing fibers to contact and saturate with DNT vapors or until phase equilibrium was reached (48 hours in this case). A liquid extraction technique was employed to quantitatively remove the captured DNT from the composite thin film. A solvent - acetone in this example - was placed on the exposed sample in a vial, then sealed with screw cap, and sonicated for 30 minutes. The supernatant was separated and subsequently analyzed with a GC-MS. The thin films were composed of 10% wt. of polymer - PDMS in this example - and 90% wt. of a nanostructured material (all material milled to less than 0.5 microns particles size). The metal fiber weight gains ≤1% after coating with a composite thin film.

As one specific example for making a cylindrical SPME vapor collector device with phenyl nanoporous SiO2/PDMS composite coating (last sample in Table 2), the coating was composed of 16.7% wt.of PDMS and 83.3% wt. of phenyl modified MCM-41 silica. The composite coating slurry was prepared by mixing ball milled Phenyl modified nanoporous silica (MCM-41)/isopropanol slurry with fresh made PDMS. The slurry contains 2 wt % Phenyl modified MCM-41, 0.4 wt % PDMS, 41 wt % water and 56.6 wt % of isopropanol. The slurry was dip coated on metal fibers. Multiple layers of coating were applied on the metal fiber to achieve 15-30 mm coating thickness.

As one specific example for making a planar collector device for the capture of metals in liquids, SH-silica was made with known silane methods (i.e. refluxing in reactants in toululene). Thiol propyl silane was reacted with a high surface area nanofiberous cabosil to form high surface area SH functionalized silica, which has a high affinity and capacity for softer metals such as Hg, Ag, and Pb. The SH-Cabosil composite thin films were made of 55 to 70% wt silica sorbent material and 30-45% wt Nafion®. The particles of SH-Cabosil silica were dispersed in the polymer solution (used as received) by sonication for 15-30 minutes prior to coating on planar substrate discs. The thin film used was allowed to air dry overnight. Thicker films can be made with multiple coatings. Oxide materials, including manganese oxides, iron oxide, and their composites, which have high affinity toward various metals—especially toxic and precious metals—can be simply mixed into the polymer solution and deposited as previously described. The manganese oxide composite thin films have showed a high capacity for adsorption of trace metals from natural waters.

Embodiments of the present invention include thin films applied to planar surfaces such as glass, stainless steel, metal or plastics. These planar supports have shown to be effective for separation and chemical sampling in aqueous environments. In one application, the functionalized nanostructure sorbent materials have been combined with the polymer Nafion®, and the composite material was applied as a thin film to the planar support (see FIGS. 2A and 2B). The planar disks—as glass, stainless steel or polymer—were exposed to river water spiked with a certain amount of mercury (Hg). Functionalized and un-functionalized composite thin films of equivalent thickness and thin film mass are compared by percent removal of Hg from river water as data shown in FIG. 6, FIG. 7, and FIG. 8. With the appropriate composition, the composite thin films clearly provide an excellent platform for removal of other metals from aqueous environments. Further, these composite thin film materials have been tested in the application of sampling and detection of radionuclide particles. Planar films are of particular interest to many analytical applications requiring thin film for assay such as XRF and alpha spectroscopy. The same coatings on filters and fibers are of interest to resource recovery, remediation and industrial process applications.

Figure 6:
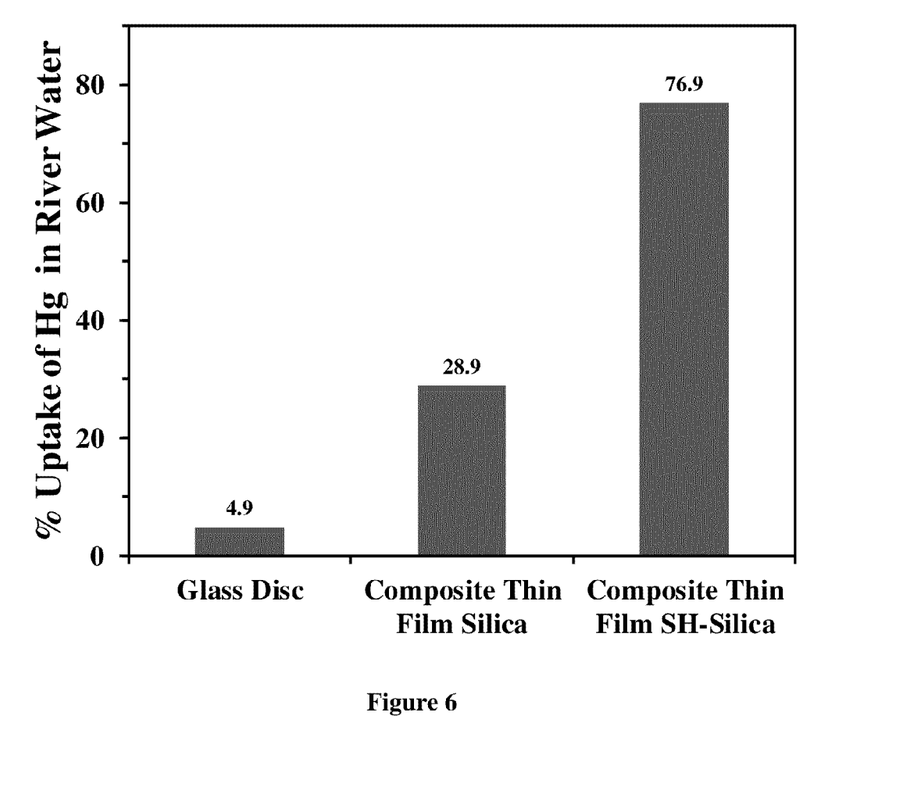
FIG. 6 shows a comparison of functionalized and un-functionalized composite thin films of equivalent thickness (~10 micron thick) and thin film mass by percent removal of metals (mercury in this case) from the river water.

FIG. 6 shows a graphical representation of a composite thin film used for Hg removal in river water. The composited thin films were coated on glass discs of 25 mm diameter. They were composed of 70% wt. nanostructured materials and 30% wt. Nafion®. The coated and uncoated discs were contacted with 50 mL river water containing ~100 ppb Hg at neutral pH and shaken continuously at 120 rotations per minute (rpm) over 24 hours. Liquid per solid ratio in this case was 50 L/g sorbent according to the nanostructured material contained in the composite thin film. After the phase equilibrium was reached, the solution before and after contact with the composite thin film was analyzed for detecting Hg by ICP-MS. The thin film clearly helps with capture/removal of Hg from river water. The thiol (SH—) modified nanoporous silica of 5 µm particle size clearly provided better performance than the unmodified silica nanomaterial of 5 µm MCM-41 in this case. The capacity of SH-nanoporous silica is not significantly reduced even though the material is bound to the support with a polymer, compared to the SH-nanoporous silica at the same liquid per solid ratio. The surface chemistries of the composite thin films can be simply installed, adjusted and optimized for specific metals (other toxic metals, basic metals, precious metals, and radionuclides) and environmental application (salt waters, acid waters, etc.).

It can be observed that the composite thin film material, particularly with appropriate surface chemistry (thiol for mercury in this particular case) enables effective collection from aquatic environments. It is clear from FIG. 6 that the increased uptake of soft metal ions by the composite thin film—achieved from the capability of functionalized sorbent as a percent uptake of Hg—was increased almost 3 times when compared to the thin film of Nafion®-nanoporous silica. Similar trends can be seen in Table 3 and exact performance enhancements are dependent upon materials, configuration and solution conditions. Nafion® has selectivity for cations through its hydrophilic negatively charged sulphonate group, however it appears to have only minor impact for the uptake of these metals when compared to the highly selective binding of thiol and large surface of nanoporous silica. The result indicates that Nafion® acted as a hydrophilic porous binder allowing metal ions to diffuse through the composite and is not acting as the principle adsorbent. The affinity and ability in binding of the materials were not significantly reduced in the format of a thin film. This suggests that, beside the very high functional density, the material does not lose the active binding sites when used with Nafion®.

Table 3 shows performance of composite thin film, functionalized nanostructured material, and traditional sorbents for recovery of precious and toxic metals from river water. The sorption affinity of the sorbents was calculated and presented in the term of distribution coefficient ($K_d$, mL/g), as well as the percent captured from solution. The $K_d$ is simply a mass-weighted partition coefficient between solid phase and liquid supernatant phase. The composite thin film of this invention clearly has higher capture efficiencies than traditional sorbents, as shown in Table 3. The performance of the composite thin film has comparable performance with a pure functionalized nanostructured material, but it is in a form factor that enables specific applications (like analysis or low back pressure separations). The composite thin films show better capacity than commercial materials typically used for heavy metal collection from liquid phases (i.e. waste, water treatment natural waters). The thin film format may readily be used in low backpressure and membrane extraction systems. Similar performance can be expected from other applications not involving heavy metals. The data was obtained and compared at similar conditions of sorption contact; neutral pH solutions, liquid per solid ratio of 50,000 g/mL (except, Ag uptake by composite thin film was perform at liquid per solid ratio of 25,000), equilibrium phase data. The composite thin film for Ag and Hg uptake were made from 55% wt. and 70% wt. of SH-nanostructured silica, respectively. Thin films were coated on stainless steel discs of 22 mm diameter and glass disc of 25 mm diameter for Ag and Hg uptake, respectively. The thin film contained ~1 mg functionalized nanostructure silica. The thickness of the thin film was ~10-15 µm. For Ag uptake, the experiment was performed in 25 mL of river water; initial concentration of Ag ~60 ppb, pH of solution throughout the experiment was ~5-6.5 during 24 hours of contact time. For Hg uptake, the experiment was performed in 100 mL of river water; initial concentration of Hg ~100 ppb, pH of the solution throughout the experiment was ~7.0-7.6. The comparison experiments with commercial sorbents and SH-nanostructured silica were performed at initial concentration of Ag and Hg ~30 ppb at pH ~6.0 (except, SCX, pH at equilibrium was 7.2), batch sorption contact were continued over 2 hours.

TABLE 3

Collection of Ag and Hg with thin film and resins from river water

| Sorbent materials | Ag | | Hg | |
| --- | --- | --- | --- | --- |
| | $K_d$ (mL/g) | Capture (%) | $K_d$ (mL/g) | Capture (%) |
| Thin Films | | | | |
| SH-Cabosil Composite Thin film | 750000* | 97* | 3000000 | 98 |
| SH-Nanoporous Silica Composite Thin Film | 650000 | 93 | 960000 | 95 |
| Component Materials | | | | |
| SH-Cabosil Silica | 5300000 | 99 | 4500000 | 99 |
| SH-Nanoporous Silica | 4500000 | 99 | 3600000 | 99 |
| Bare Cabosil | 4000 | 8 | 0 | 0 |
| Bare Nanoproous Silica | 200 | 4 | 0 | 0 |
| Commercial Materials | | | | |
| Activated Carbon (Darco KB-B) | 4700 | 9 | 150000 | 75 |
| Strong Anion Exchange Resin (SAX) | 5400 | 10 | 39000 | 0 |

TABLE 3-continued

Collection of Ag and Hg with thin film and resins from river water

| Sorbent materials | Ag | | Hg | |
|---|---|---|---|---|
| | $K_d$ (mL/g) | Capture (%) | $K_d$ (mL/g) | Capture (%) |
| Strong Cation Exchange Resin (SCX) | 450000 | 89 | 160000 | 76 |
| Chelex 100 | 6000 | 11 | 69000 | 58 |

*data was obtained from liquid per solid ratio of 25,000 mL/g sorbent.
Distribution coefficient ($K_d$) is simply a mass-weighted partition coefficient between solid phase and liquid supernatant phase. $K_d$ is a solid phase partition coefficient similar to the more commonly used solution phase equilibrium constant and represents an empirically measure of chemical affinity (for the specific conditions).

Figure 7:
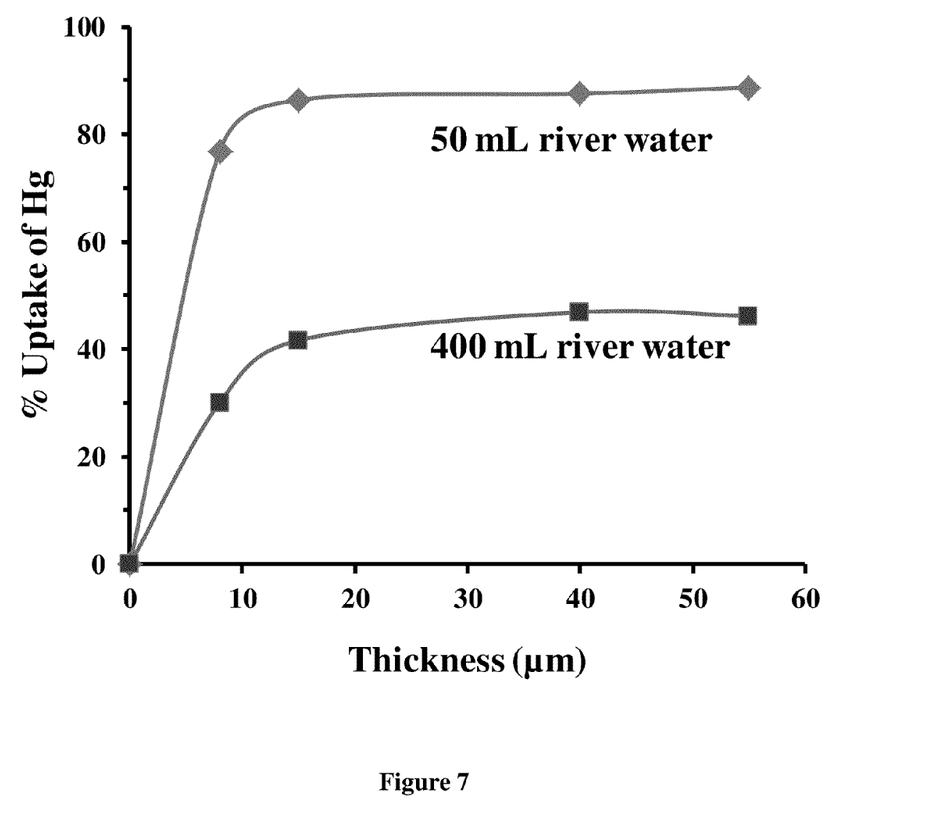
FIG. 7 shows a comparison of the percent uptake by the heavy metal mercury from river water versus composite thin film thickness.

FIG. 7 shows a specific example for the capture of heavy metals—Hg in this case—from water, for sensing or remediation applications, as a function of film thickness. Film thickness is a significant parameter for thin film applications targeting analyte collection from either air or liquid environments. Thicker films offer increased capacity by bolstering film volume and available binding sites needed for species capture. However, thicker coatings suffer from reduced mass transfer as access to the binding/chemical reaction sites deeper in the film becomes harder. As shown in FIG. 7, performance of the film does not increase after a certain thickness (depending upon time, mass flow to surface, film composition, film chemistry, and whether the functional media is gas or liquid). Therefore, an optimized thin film thickness is applied for each application depending on use. The thin film in this experiment was made from 70% wt. SH-nanoporous silica and 30% wt. Nafion® by coating the composite solution on glass discs of 25 mm diameter. The effect of film thickness in adsorption of soft metals from liquid phase was evaluated with two matrix volumes of 50 mL and 400 mL at a neutral pH containing ~100 ppb of Hg ions. The percent uptakes of Hg from river water versus film thickness are shown in FIG. 7. Similar uptake trends can be seen from both matrix volumes; the maximum Hg uptakes occur at a film thickness of approximately 20-40 μm and remained constant. This indicates that the Hg ions were only able to penetrate through the thin film and bind with available SH-sites at maximum thickness of 40 μm. A constant percentage uptake of Hg was seen as film thickness increased indicating that no mass transfer occurred beyond ~40 μm. It is clear that mass transfer in the film has a significant negative effect in adsorption of Hg ion from liquid phase past a certain thickness.

The lower percent uptake of Hg from the larger water volume (400 mL vs. 50 mL) percent uptake in FIG. 7 can be clearly seen. However, in terms of mass uptake, the total Hg uptake was up to 21 μg by 40 μm thick composite film from a water volume of 400 mL. On the other hand, only ~5 μg of Hg was obtained from 50 mL by a thin film with equivalent thickness. The lower percent uptake of the 400 mL volumes when compared to the 50 mL volume is a function of chemical equilibrium and the saturation of the thin film sorbent. This is further shown in FIG. 8.

Figure 8:
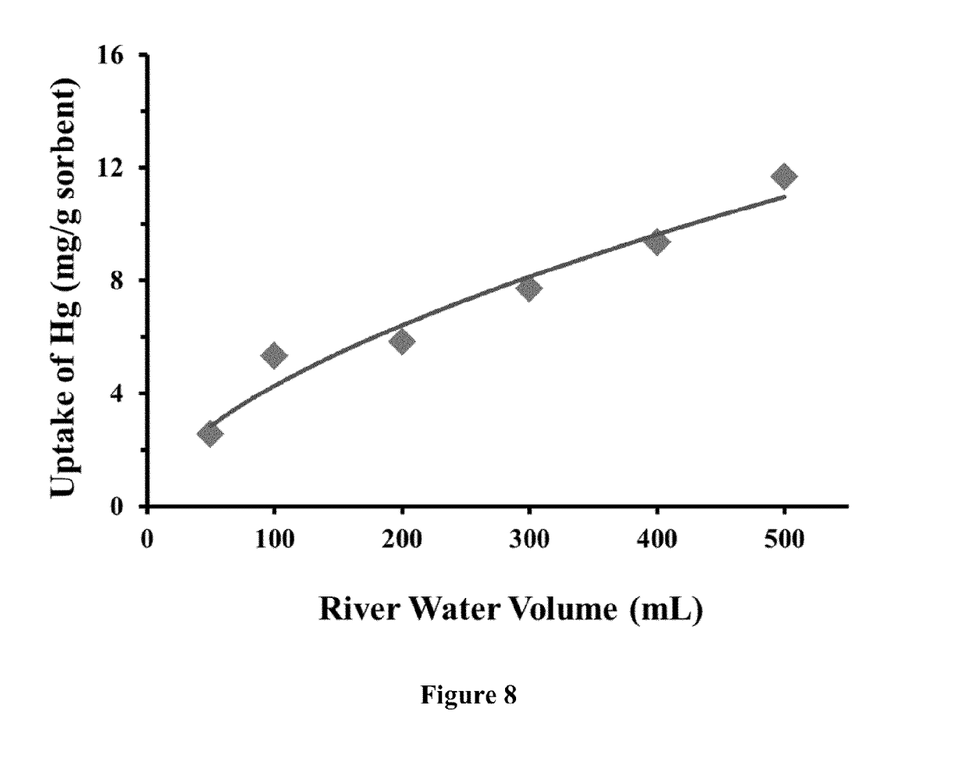
FIG. 8 shows a comparison of the uptake capacity of composite thin films as function of matrix volume.

FIG. 8 shows the uptake capacity of the composite thin films of the invention as a function of volume of river water. The capacity of the selected thin film disks were tested using composite thin film with 15 μm thickness (and equivalent mass). The thin film coated glass disc of 25 mm diameter contained 2 mg of SH-nanoporous silica (70% wt. sorbent, 30% wt. Nafion®). The thin films were exposed to river water (pH ~7 containing Hg ~100 ppb) of different volumes from 50 mL to 500 mL for 48 hours. Increasing mass uptake of Hg was achieved as the matrix volume increased. This is because the larger water volume contains a higher number of Hg ions, and the SH-nanoporous silica composite thin film possesses a high density of available binding sites, resulting in higher uptake of the metal ions (this is regulated by SH-modified sorbent affinity and the ratio of sorbent volume to solution volume). The near linear trend of Hg uptake suggests that the thin film was not saturated, and was able to adsorb more Hg until the film was saturated. This result demonstrates that the SH-nanoporous silica composite thin film is able to adsorb the Hg at performance levels above 12 mg/g of SH sorbent. The composite thin film shows higher adsorption of Hg ions in river water than that of various commercial sorbents as compared at the same liquid per solid ratio. Commercial sorbents (such as activated carbon, Chelex® 100, $MnO_2$ sorbents, phosphonic resins, anion and cation exchange resins) were able to uptake Hg ions less than 1 mg/g sorbents at liquid per solid ratio of 50000 mL/g sorbent, while the SH-nanoporous silica incorporated thin film was able to uptake Hg ion up to 5 mg/g sorbent.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A composite material for capture and concentration of a species of interest, comprising:
   a. a substrate;
   b. a porous composite thin film formed by mixing a porous polymer with a nanostructured material, wherein the porous polymer is present in a range from 5 wt % to about 40 wt % based on the weight of the porous composite thin film, wherein the porous polymer includes strands randomly dispersed within the nanostructured material and binding the nanostructured material, and the substrate is coated by the porous composite thin film, wherein the species of interest is captured and concentrated in the porous composite thin film for trace level detection in air or aqueous environments;
   wherein the porous polymer is one of the following: polydimethylsiloxane (PDMS), polytetrafluoroethylene (PTFE), hydroxypropyl cellulose (HPC), sulfonated tetrafluoroethylene, and polyamide;
   wherein the nanostructured material comprises a network of a plurality of nanoporous particles wherein each nanoporous particle comprises nanoporous silica, nanofiber silica, mesoporous silica, composites of mesoporous silica, carbon nanotube, metal-organic framework (MOF), graphene, high surface area polymer, a ceramic, mesoporous carbon, activated carbon, a metal oxide, a metal or any combinations thereof; and
   c. surface chemistry on the nanostructured particle, wherein the surface chemistry is chemically functionalized prior to inclusion to the porous composite thin film.

2. The composite material of claim 1 wherein a thickness of the porous composite thin film is in a range of about 0.1 μm to about 100 μm.

3. The composite material of claim 1 wherein the substrate comprises one of the following: a fiber, a ceramic, a glass, a bead, stainless steel, leather, rubber, wood a metal wire, a planar surface, flexible silica coated wire, a cloth material, a fiber mesh, a porous media, a filter, a tubular structure, a sensor surface, and combinations thereof.

4. The composite material of claim 1 wherein the surface chemistry on the nanoporous particle forms a chemically reactive layer.

5. The composite material of claim 4 wherein the chemically reactive layer is at least one of the following: a sorbent layer, a silane, a physisorbed low vapor pressure organic, and a chemically ionic or covalent bound surface chemistry.

6. The composite material of claim 5 wherein the sorbent layer comprises a multifunctional chemistry, wherein the multifunctional chemistry is at least one of the following: organics, organometallics, metals, nanoparticles, complex molecules, and combinations thereof.

7. The composite material of claim 1 wherein the species of interest is in a gas-phase or a liquid-phase.

8. The composite material of claim 7 wherein the gas or liquid-phase species is at least one of the following: an explosive, an explosive variant, a chemical weapons agent, a pesticide, a drug, a volatile organic compound (VOC), a semi-volatile compound, a precious metal, a toxic metal, a rare earth element, and a radionuclide.

9. The composite material of claim 1 wherein the thin film bound to the substrate is integrated into commercially available equipment that directly interfaces with analytical testing equipment for testing, wherein the equipment is at least one of the following: a gas chromatographer (GC), a mass spectrometer, a gas chromatography coupled to a mass spectrometer (GC-MS), an ion mobility spectrometer (IMS), and a spectrometer using x-rays and photons in the UV-IR range.

10. The composite material of claim 1 wherein the porous composite thin film is coated onto the substrate via clip coating, spin coating, drop coating, or spray-on.

* * * * *